United States Patent [19]

Suzuki et al.

[11] 4,327,580
[45] May 4, 1982

[54] METHOD OF AND APPARATUS FOR INSPECTING PNEUMATIC TIRE

[75] Inventors: Kouji Suzuki, Musashino; Takanori Takata, Higashimurayama, both of Japan

[73] Assignee: Bridgestone Tire Company Limited, Tokyo, Japan

[21] Appl. No.: 157,243

[22] Filed: Jun. 6, 1980

[30] Foreign Application Priority Data

Mar. 3, 1980 [JP] Japan ................. 55-026310

[51] Int. Cl.$^3$ ........................... G01M 17/02
[52] U.S. Cl. ........................................ 73/146
[58] Field of Search ........... 73/146; 33/203.11

[56] References Cited

U.S. PATENT DOCUMENTS 3,928,796 12/1975 Kaiser ................. 324/61 R
4,258,567 3/1981 Fisher ...................... 73/146

Primary Examiner—Jerry W. Myracle
Attorney, Agent, or Firm—Cushman, Darby & Cushman

[57] ABSTRACT

To inspect a pneumatic tire for excessively coarse or dense tire cord arrangement in a side wall portion of the tire, a surface irregularity resulting from such improper tire cord arrangement is detected by the use of a capacitance-type distance detector unit positioned in the vicinity of the side wall portion of the tire inflated, wherein one of the tire and the detector units is driven so that the tire and detector unit turn with respect to each other about the center axis of the tire for producing from the detector unit an analog signal which varies with the distance between the outer surface of the detector unit and the tire and wherein the analog signal from the detector unit is processed to detect an improper convexity or concavity in the side wall portion of the tire.

10 Claims, 27 Drawing Figures

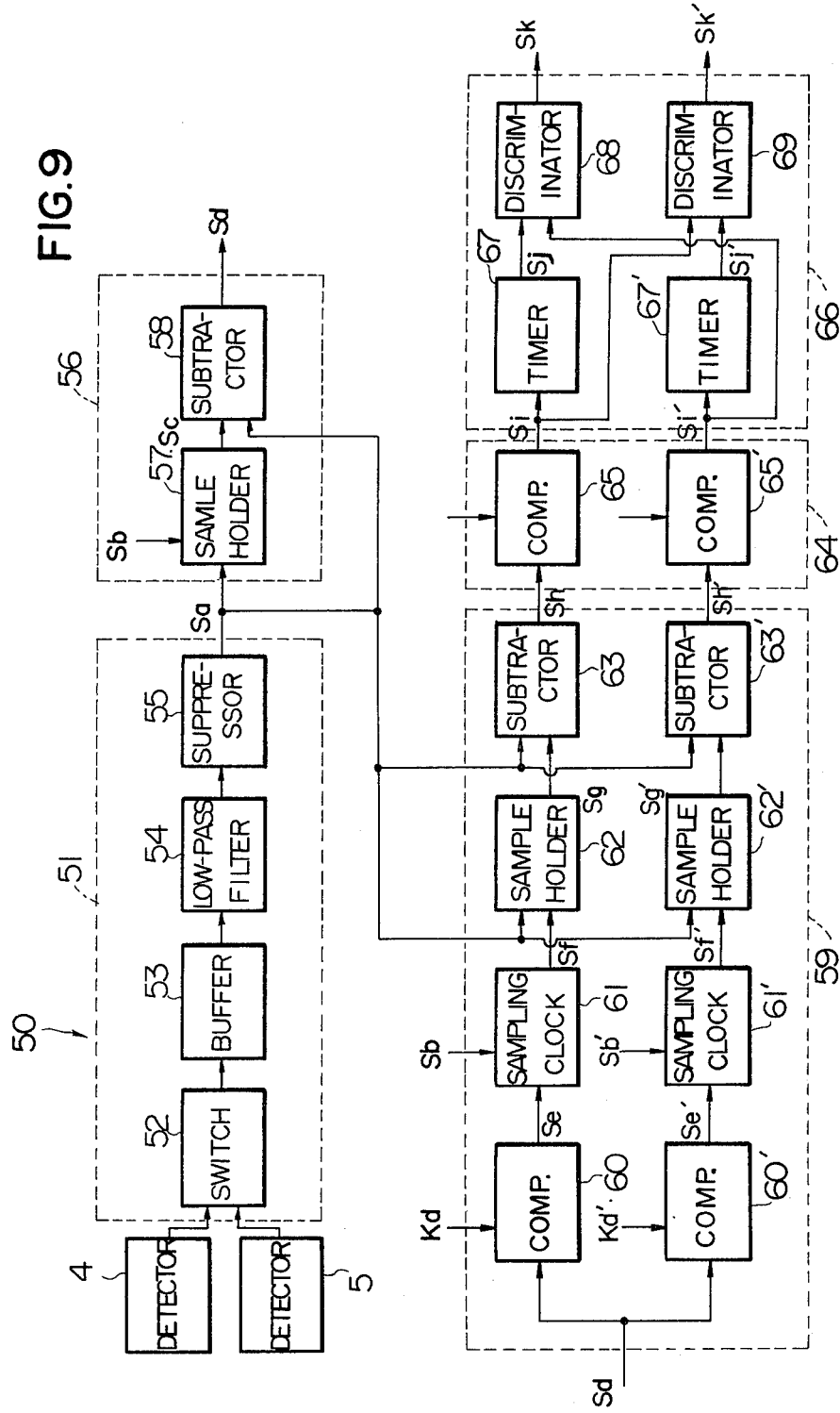

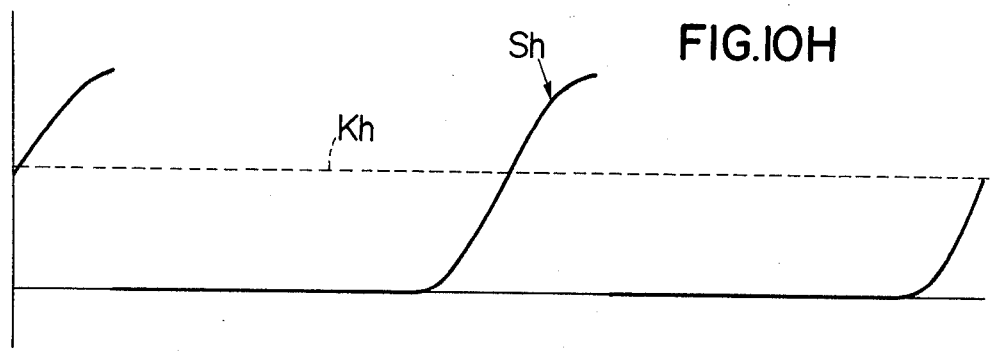
FIG.10H
FIG.10H'
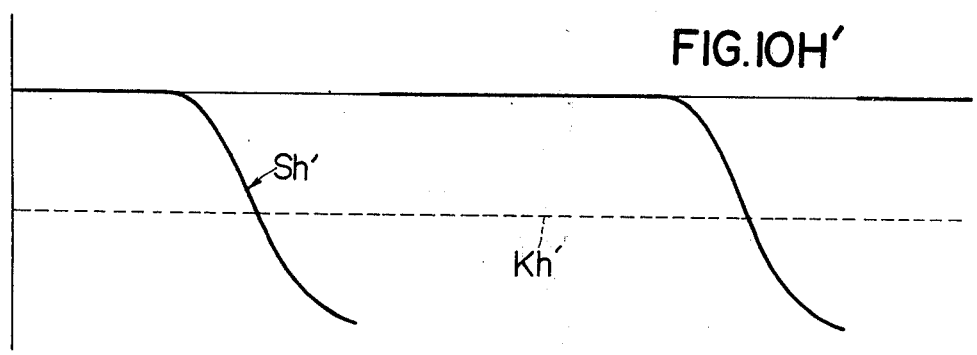
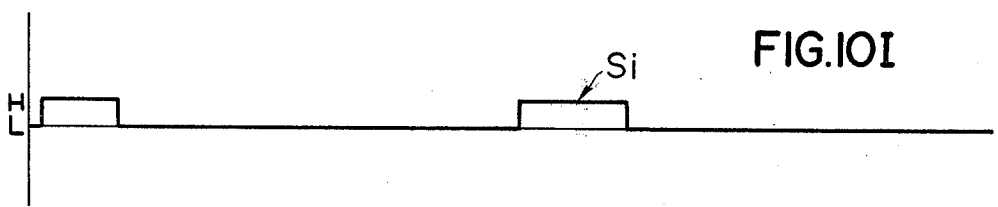
FIG.10I
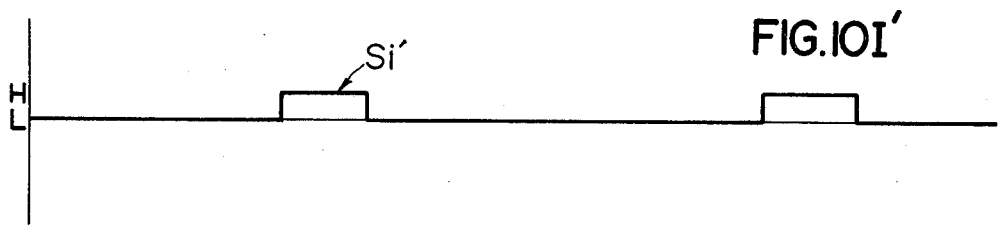
FIG.10I'

METHOD OF AND APPARATUS FOR INSPECTING PNEUMATIC TIRE

FIELD OF THE INVENTION

The present invention relates to a method of and an apparatus for inspecting pneumatic tires for automotive use and, particularly, to a method of and an apparatus for inspecting an inflated pneumatic tire for an irregularity in the arrangement of the tire cords forming part of a side wall portion of the pneumatic tire.

DESCRIPTION OF THE PRIOR ART

For the purpose of reducing the production cost of pneumatic tires for automotive use and improving the fuel economy of automotive vehicles, it is advantageous to simplify the construction and lessen the weight of a tire. In the case of a radial tire, for example, such a purpose is accomplished by substituting a tire carcass constructed of a single tire cord fabric for a conventional carcass composed of two tire cord fabrics which are bonded together by an adhesive. If the tire cords forming a portion of a single-ply tire cord fabric happen to be arranged at excessively wide intervals from each other, the mechanical strength of the tire deteriorates in the vicinity of the excessively coarse tire cord arrangement. It is for this reason important to inspect a pneumatic tire for irregularities in the tire cord arrangement upon completion of the production of the tire.

It has been proposed to use a differential amplifier to measure a radial runout of a tire tread as in U.S. Pat. No. 3,550,442. A detecting device using such a differential amplifier may be utilized to detect irregularities of the surface of a side wall portion of a tire. A difficulty is however encountered in this type of detecting device in that the detector unit is held in contact with the side wall portion of the tire during inspection of the tire and is thus unable to discriminate the improper surface irregularities of the side wall portion from normal surface irregularities such as the embossed patterns and spews or small rubber projections of the side wall portion of the tire. Since, furthermore, the detector unit is held in direct contact with the side wall portion of the tire being inspected, the detector unit is not only subject in itself to wear and abrasion but may produce scratches on the surface of the side wall portion of the tire inspected. The direct contact between the tire and the detector unit is also an obstacle to increasing the performance efficiency of inspection.

SUMMARY OF THE INVENTION

The present invention overcomes these and other drawbacks which have been inherent in prior-art tire inspecting equipment.

In accordance with one outstanding aspect of the present invention, there is provided a method of inspecting an inflated pneumatic tire for an irregularity in the arrangement of the tire cords forming part of a side wall portion of the tire, comprising the steps of driving one of the tire and a capacitance-type distance detector unit positioned in the vicinity of the side wall portion of the tire so that the detector unit and the tire are continuously rotated with respect to each other about the center axis of the tire, measuring the distance between the detector unit and the side wall portion of the tire continuously in a circumferential direction of the side wall portion of the tire for producing an analog signal variable with the detected distance, and detecting from the aforesaid signal a distance change representative of a surface irregularity resulting from the irregularity in the arrangement of the tire cords. In this instance, the distance change may be detected from the above mentioned signal when, during a predetermined period of time, the distance represented by the signal changes in one direction by an amount larger than a predetermined value and thereafter changes in the opposite direction by an amount larger than a predetermined value. As an alternative the distance change may be detected by (1) differentiating the above mentioned signal with respect to time for producing a signal (Sd) representative of the differential coefficient to the distance represented by the signal from the detector unit, (2) producing a first signal (Sh) substantially representative of an amount of change in the distance represented by the signal from the detector unit when the signal representative of the differential coefficient is indicative of a distance change in one direction and larger in magnitude than a first predetermined value (Kd) and a second signal (Sh') substantially representative of an amount of change in the distance represented by the signal from the detector unit when the signal representative of said differential coefficient is indicative of a distance change in the opposite direction and larger in magnitude than a second predetermined value (Kd'), (3) comparing the first and second signals with reference signals representative of third and fourth predetermined values (Kh and Kh'), respectively, for producing a third signal (Si) when the first signal is larger in magnitude than the reference signal representative of the third predetermined value and a fourth signal (Si') when the second signal is larger in magnitude than the reference signal representative of the fourth predetermined value, and (4) producing a fifth signal (Sk) in the presence of the fourth signal during a first predetermined period of time (t) after the third signal is produced and a sixth signal (Sk') in the presence of the third signal during a second predetermined period of time (t') after the fourth signal is produced.

In accordance with another outstanding aspect of the present invention, there is provided a tire inspecting apparatus for inspecting an inflated pneumatic tire for an irregularity in the arrangement of the tire cords forming part of a side wall portion of the tire, comprising a capacitance-type distance detector unit positioned in the vicinity of the side wall portion of the tire, drive means operative to drive one of the tire and the detector unit so that the detector unit and the tire are continuously rotated with respect to each other about the center axis of the tire, the detector unit being operative to produce an analog signal variable with the distance between the detector unit and the side wall portion of the tire continuously in a circumferential direction of the side wall portion, and electric signal processing means electrically connected to the detector unit and operative to detect from the aforesaid signal a distance change representative of a surface irregularity resulting from the irregularity in the arrangement of the tire cords. In the tire inspecting apparatus thus constructed and arranged, the electric signal processing means may comprise an analog-to-digital converter for converting the aforesaid analog signal into a corrseponding digital signal, and an inspection circuit operative to detect the aforesaid distance change when, during a predetermined period of time, the distance represented by the digital signal changes in one direction by an amount larger than a predetermined value and thereafter changes in the opposite direction by an amount larger than a predetermined value. As an alternative, the electric signal processing means may comprise a differentiator circuit electrically connected to the distance detector unit and operative to differentiate the aforesaid signal with respect to time and to produce an output signal (Sd) representative of the differential coefficient of the distance represented by the signal from the distance detector unit, a signal modifier circuit connected to the output terminal of the differentiator circuit and operative to produce a first output signal (Sh) substantially representative of an amount of change in the distance represented by the signal from the detector unit when the output signal from the differentiator circuit is indicative of a distance change in one direction and larger in magnitude than a first predetermined value (Kd) and a second output signal (Sh') substantially representative of an amount of change in the distance represented by the signal from the detector unit when the output signal from the differentiator circuit is indicative of a distance change in the opposite direction and larger in magnitude than a second predetermined value (Kd'), a comparator circuit connected to the signal modifier circuit and operative to compare the first and second output signals with reference signals representative of third and fourth predetermined values (Kh and Kh'), respectively, and to produce a third output signal (Si) when the first output signal from the signal modifier circuit is larger in magnitude than the reference signal representative of said third predetermined value and a fourth output signal (Si') when the second output signal from the signal modifier circuit is larger in magnitude than the reference signal representative of said fourth predetermined value, and a discriminating circuit connected to the comparator circuit and operative to produce a fifth output signal (Sk) in the presence of the fourth output signal during a first predetermined period of time (t) after the third output signal is produced by the comparator circuit and a sixth output signal (Sk') in the presence of the third output signal during a second predetermined period of time (t') after the fourth output signal is produced by the comparator circuit.

BRIEF DESCRIPTION OF THE DRAWINGS

The basic concept of the present invention and the features and advantages of a method and an apparatus according to the present invention will be more clearly understood from the following detailed description taken in conjunction with the accompanying drawings, in which:

FIG. 9 is a block diagram showing another preferred example of the signal processing circuit for use in the tire inspecting apparatus according to the present invention; and FIGS. 10A to 10K' are timecharts showing various electric signals and pulses which appear in the signal processing circuit illustrated in FIG. 9.

BACKGROUND OF THE INVENTION

Description will be hereinafter made regarding the basic concept of the present invention with reference to FIGS. 1 to 4 of the accompanying drawings.

Figure 1:
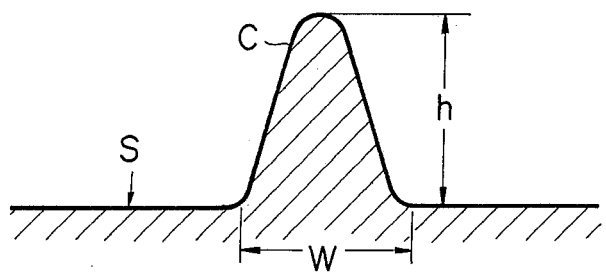
FIG. 1 is a cross sectional area showing a portion of the cross section of a side wall portion of a pneumatic tire having on the side wall portion a radial convexity resulting from the existence of excessively coarse tire cord arrangement.
Figure 2:
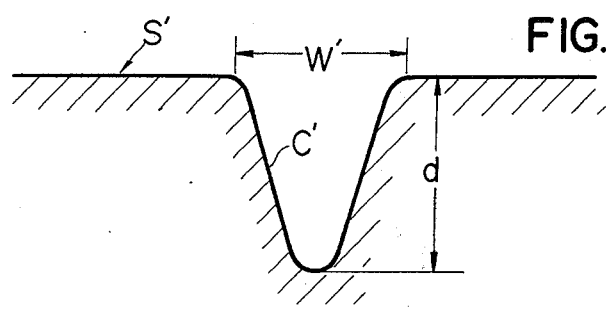
FIG. 2 is a cross sectional view showing a portion of the cross section of a side wall portion of a pneumatic tire having in the side wall portion a radial concavity resulting from the existence of excessively dense tire cord arrangement.
Figure 3:
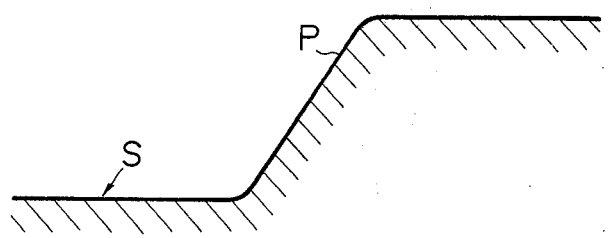
FIG. 3 is a cross sectional view showing a portion of the cross section of a side wall portion of a pneumatic tire having on the side wall portion a stepped radial projection resulting from the overlap between opposite end portions of the tire cord fabric forming part of the side wall portion of the tire.

In a pneumatic tire involving irregularities in the intervals at which the tire cords forming the cord fabric of the tire are arranged, the irregularities result in formation of convexities or concavities in a side wall portion of the tire in the vicinity of the irregularly arranged tire cords when the tire is inflated with air under pressure. If, in this instance, some of the tire cords forming the cord fabric inside a side wall portion of the tire are spaced apart from each other at intervals which are improperly wider than the intervals between the other cords inside the wall portion, the particular side wall portion of the tire is formed with a convexity or projection lengthwise extending in a radial direction of the side wall portion in the vicinity of the coarsely arranged tire cords when the tire is inflated with compressed air. In FIG. 1 of the drawings, such a radial projection formed on a side wall portion S of a pneumatic tire is indicated schematically at C and is assumed to have a width w at its base and a height h over the outer surface of the side wall portion surrounding the projection C. If, on the other hand, some of the tire cords forming the cord fabric inside a side wall portion of a pneumatic tire are spaced apart from each other at intervals which are unduly closer than the intervals at which the other of the tire cords are arranged, then the side wall portion is formed with a concavity or groove lengthwise extending radially of the side wall portion as indicated schematically at C' in FIG. 2 when the tire is inflated with compressed air. In FIG. 2, the radial groove C' is assumed to have a width w' at its open end and a depth d in the side wall portion S of the tire.

The irregularities in the arrangement of the tire cords forming the cord fabric of a pneumatic tire can thus be detected from the formation of the radial projection C or the radial groove C' in a side wall portion of the tire.

The tire cords arranged at improperly wide intervals in the cords fabric of a pneumatic tire deteriorate the mechanical strength of the tire as a whole and, for this reason, a pneumatic tire forming radial projections on its side wall portions as indicated at in FIG. 1 is objectionable from the view point of safety in driving an automotive vehicle. The existence of the radial grooves in the side wall portions of a pneumatic tire as indicated at in FIG. 2 does not critically affect the mechanical strength of the tire but it is advisable to reject a pneumatic tire forming such grooves.

Besides the objectionable projections or grooves which a pneumatic tire may have thus formed in its side wall portions due to the irregularities in the arrangement of the tire cords, the side wall portions of the tire are ordinarily formed with normal surface irregularities including embossed patterns indicative of identification data and emblems and the spews or small rubber projections produced on the outer surfaces of the side wall portions by the vent holes in a mold during curing of the green tire. Furthermore, a side wall portion of a pneumatic tire inflated with compressed air usually has a stepped protrusion P or a stepped depression P' lengthwise extending in a radial direction of the side wall portion as indicated schematically in FIGS. 3 and 4. The stepped radial protrusion or depression P or P' is formed by the overlap between the circumferentially opposite end portions of the cord fabric inside the side wall portion under which the end portions of the cord fabric are tied together.

Whereas, it has been ascertained by the inventors of the present invention that the width w and the height h of the radial projection C resulting from the excessively coarse tire cord arrangement as shown in FIG. 1 and the width w' and the depth d of the radial groove C' resulting from the excessively dense tire cord arrangement as shown in FIG. 2 respectively fall within specific ranges which are dictated by the type and design of the tire and the pressure of air under which the tire is inflated. If, therefore, the type and design are specified and the inflation pressure is determined of a pneumatic tire, the above mentioned stepped radial protusion and depression P and P' of the side wall portions of the tire can be clearly distinguished from the radial projection and groove C and C' of the side wall portions in terms of the specific ranges of the width w and height h of the projection C and the width w' and depth d of the groove C'. On the other hand, the embossed patterns indicative of the identification data and emblems on the side wall portions of a tire can be recognized as groups of discrete pro- jections distributed in circumferential directions of the side wall portions, while the spews formed on the side wall portions of the tire can be recognized as randomly distributed spots projecting from the outer surfaces of the side wall portions. One of the outstanding features of the present invention is to distinguish the objectionable convexities and concavities of the side wall portions of a pneumatic tire from the various normal projections and depressions of the side wall portions on the basis of the above described basic principles.

Another outstanding feature of the present invention is to detect the surface irregularities of the side wall portions of a pneumatic tire by the use of a capacitance-type distance detector adapted to measure the distance between the detector and a given object in a contactless fashion and to convert a change in the detected distance into a change in the electrostatic capacitance. The distance detector has a sensing surface which is so shaped as to measure wider in a direction to correspond to a radial direction of a side wall portion of the tire to be inspected than in a direction to correspond to a circumferential direction of the side wall of the tire. By virtue of such a configuration of the sensing surface, the distance detector is less responsive to the normal surface irregularities such as the embossed patterns and spews on the side wall portion of the tire than to the objectionable convexities resulting from the excessively coarse and dense tire cord arrangements, respectively. The capacitance-type distance detector used in the present invention is thus capable of projecting an analog output signal which is practically not affected by such surface irregularities. The tire to be inspected is driven to continuously turn at a constant, predetermined angular velocity about its center axis with the distance detector fixedly positioned in the neighborhood of the tire or the distance detector per se is driven for continuous rotation at a constant, predetermined angular velocity about the center axis of the tire which is held stationary. Thus, the analog output signal delivered from the distance detector continuously varies with the change in the distance between the outer surface of the side wall portion of the tire being inspected.

A third outstanding feature of the present invention is that the analog output signal delivered from the capacitance-type distance detector of the nature above described is processed in an electric circuit which is adapted to determine that the tire being inspected has an objectionable convexity (viz., the radial projection C in FIG. 1) or an objectionable concavity (viz., the radial groove C' in FIG. 2) on a side wall portion thereof on the basis of the following basic principles:

1. The tire is determined to have an objectionable convexity or projection if and when, during a predetermined period of time T, the distance represented by the signal delivered from the distance detector is decreased by an amount larger than a predetermined value Kh and is thereafter increased by an amount larger than a predetermined value Kh'.

2. The tire is determined to have an objectionable concavity or groove if and when, during a predetermined period of time T, the distance represented by the signal delivered from the distance detector is increased by an amount larger than the predetermined value Kh' and is thereafter decreased by an amount larger than the predetermined value Kh.

As an alternative to the principle 1, the tire is determined to have an objectionable convexity if and when 1-1. the distance represented by the signal delivered from the distance detector is decreased with a differential coefficient larger in absolute value than a predetermined value Kd, 1-2. the decrement in the detected distance is larger than a predetermined value Kh, 1-3. the distance represented by the signal from the detector is increased with a differential coefficient larger than a predetermined value Kd' in a predetermined period of time t after the distance decrement larger in absolute value than the predetermined value Kh is reached, and 1-4. the increment in the detected distance is larger than a predetermined value Kh'.

On the other hand, the tire is determined to have an objectionable concavity if and when 2-1. the distance represented by the signal delivered from the distance detector is increased with a differential coefficient larger than the predetermined value Kd', 2-2. the increment in the detected distance is larger than the predetermined value Kh', 2-3. the distance represented by the signal from the detector is decreased with a differential coefficient larger in absolute value than the predetermined value Kd in a predetermined period of time t' after the distance increment larger than the predetermined value Kh' is reached, and 2-4. the decrement in the detected distance is larger in absolute value than the predetermined value Kh.

DESCRIPTION OF THE PREFERRED EMBODIMENTS

Description will be hereinafter made regarding a preferred embodiment of the present invention with reference to FIGS. 5 to 8 of the accompanying drawings.

Figure 5:
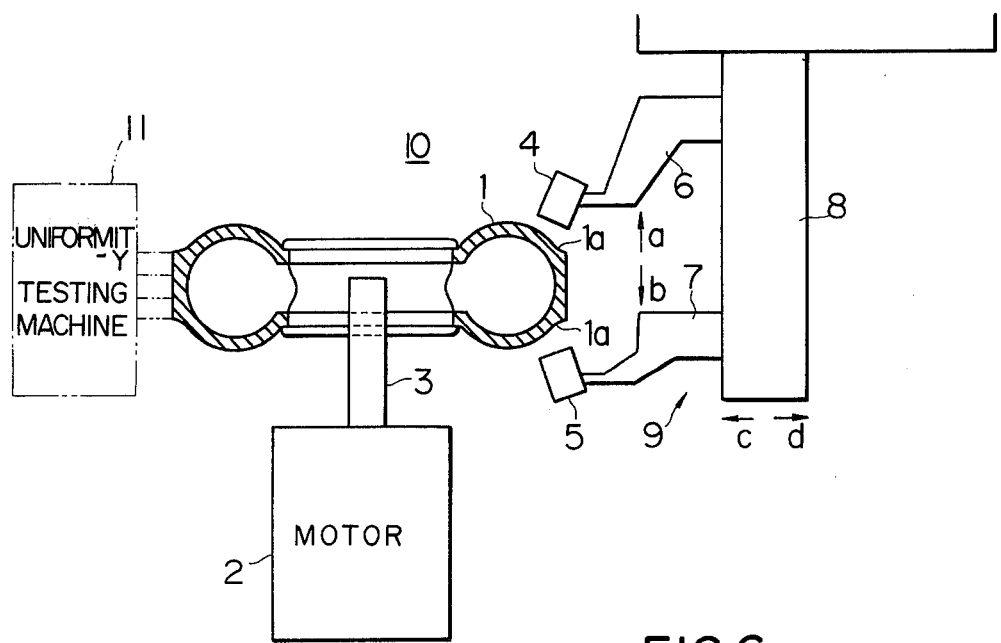
FIG. 5 is a schematic side elevation view showing, partially in cross section, the arrangement in which a tire inspecting apparatus embodying the present invention is in operation with an inflated pneumatic tire.

In FIG. 5, an inflated pneumatic tire 1 to be inspected is shown having side wall portions 1a and supported by a motor 2 having an output shaft 3 projecting upwardly from the motor casing and having a fixed axis of rotation in a vertical direction. The tire 1 is detachably mounted on the output shaft 3 of the motor 2 in such a manner as to have its center axis substantially aligned with the axis of rotation of the motor output shaft 3 and is, thus, rotatable about the fixed vertical axis of the shaft 3.

A tire inspecting apparatus provided by the present invention is positioned in the vicinity of the pneumatic tire 1 thus supported by the motor 2 and comprises two, upper and lower, capacitance-type distance detector units 4 and 5 supported by two, upper and lower brackets 6 and 7, respectively, which are vertically spaced apart from each other and which project horizontally from a vertical carrier column 8 depending from a suitable stationary support structure. Each of the upper and lower brackets 6 and 7 and accordingly each of the capacitance-type distance detector units 4 and 5 are movable upwardly as indicated by an arrow a and downwardly as indicated by an arrow b with respect to the carrier column 8. The vertical carrier column 8 in turn is horizontally movable with respect to the stationary support structure and accordingly to the tire 1 in a direction to move closer to the tire 1 as indicated by an arrow c and a direction to move away from the tire 1 as indicated by an arrow d. Thus, each of the capacitance-type distance detector units 4 and 5 supported by the upper and lower brackets 6 and 7, respectively, is movable into and out of any desired position with respect to each of the side wall portions 1a of the tire. The brackets 6 and 7 and the carrier column 8 thus arranged constitute movable support means 9 in the tire inspecting apparatus provided by the present invention.

If desired, the tire inspecting apparatus, designated in its entirety by reference numeral 10, may be used in combination with a tire uniformity testing machine 11 which is schematically illustrated in FIG. 5 as being positioned opposite to the tire inspecting apparatus 10 across the tire 1 to be inspected. As is well known in the art, the tire uniformity testing machine 11 is used to inspect the balance in weight, the radial and lateral ranouts, the variation in stiffness and so forth of a pneumatic tire.

During inspection of the tire 1, the upper and lower capacitance-type distance detector units 4 and 5 are fixedly held in predetermined positions with respect to and in the vicinity of the opposite side wall portions 1a, respectively, of the tire 1 which is driven to continuously turn about the center axis thereof at a constant, predetermined angular velocity. As the tire 1 is thus turned about the center axis thereof with respect to the capacitance-type distance detector units 4 and 5, the distance between each of the detector units and the outer surface of the side wall portion 1a of the tire confronted by the detector unit varies discretely due to the presence of various normal and objectionable surface irregularities of the side wall portion. Each of the capacitance-type distance detector units 4 and 5 is responsive to such variation in the distance and produces a capacitance change corresponding to the change in the distance. The change in the electrostatic capacitance in each of the detector units 4 and 5 is detected as or converted into a change in voltage and, thus, each of the detector units 4 and 5 delivers a voltage signal which continuously varies with the detected distance.

Figure 6:
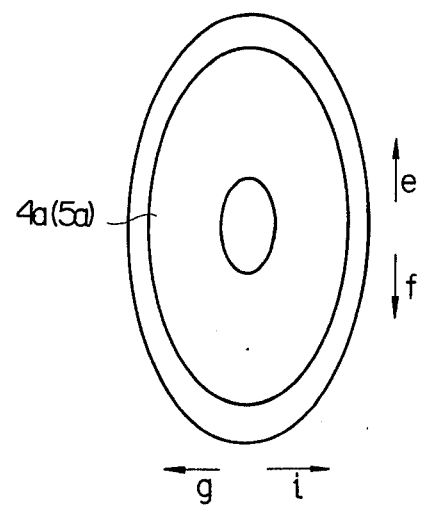
FIG. 6 is a schematic frontal view showing a preferred example of the sensing surface of each of the capacitance-type distance detector units forming part of the tire inspecting apparatus illustrated in FIG. 5.

In the tire inspecting apparatus according to the present invention, the capacitance-type distance detector units 4 and 5 have sensing surfaces 4a and 5a, respectively, each of which is shaped in such a manner as to measure wider in a direction to correspond to a radial direction of the side wall portion of a tire as indicated by arrows e and f in FIG. 6 than in a direction to correspond to a circumferential direction of the side wall portion of the tire as indicated by arrows g and h in FIG. 6. The respective sensing surfaces 4a and 5a of the capacitance-type distance detector units 4 and 5 being thus shaped, the detector units 4 and 5 positioned to have the sensing surfaces 4a and 5b directed toward the respective outer surfaces of the side wall portions 1a of the tire 1 are less responsive to the normal surface irregularities such as the embossed patterns and spews of the side wall portions 1a than to the objectionable projections C and grooves C' of the side wall portions S and S' shown in FIGS. 1 and 2, respectively. The voltage signal produced by each of the capacitance-type distance detector units 4 and 5 is, thus, practically free from the influence of the normal surface irregularities such as the embossed patterns and spews on the outer surfaces of the side wall portions 1a of the tire and is accurately indicative of the presence of the objectionable convexities C and concavities C' of the side wall portions 1a having such objectionable surface irregularities. In FIG. 6, each of the sensing surfaces 4a and 5a of the capacitance-type distance detector units 4 and 5 is shown having a generally oval configuration when viewed in plan but may be otherwise shaped insofar as its measurements in the directions to correspond to radial and circumferential directions of a side wall portion of a tire satisfy the above described requirement.

Figure 7:
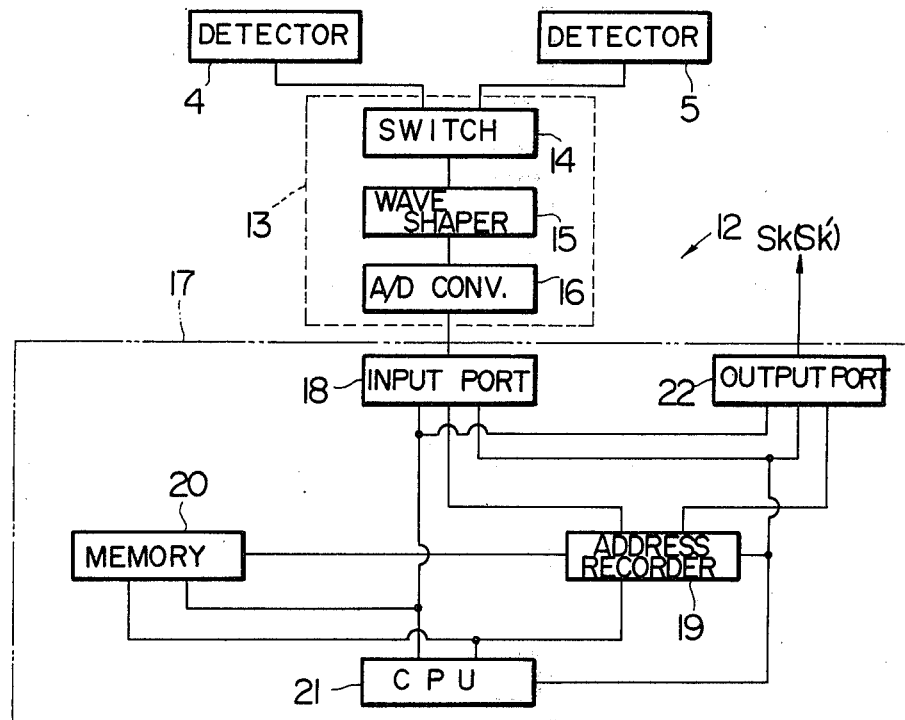
FIG. 7 is a block diagram showing a preferred example of the signal processing circuit for use in the tire inspecting apparatus embodying the present invention.
Figure 8:
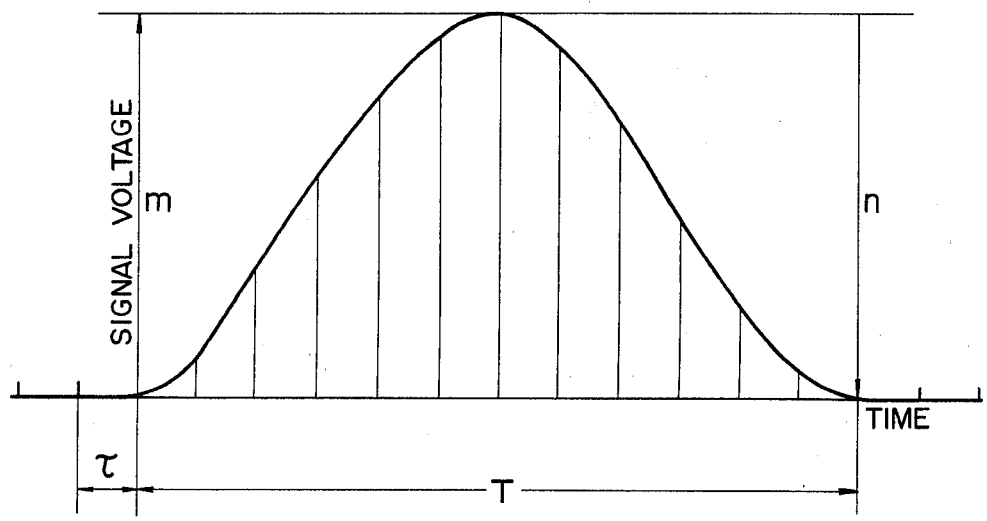
FIG. 8 is a graph showing an example of the waveform of an analog signal produced by a capacitance-type distance detector circuit for use with the circuit arrangement illustrated in FIG. 7.

The voltage signal produced by each of the capacitance-type distance detectors 4 and 5 is delivered to an electric signal processing circuit 12 illustrated in block form in FIG. 7. The signal processing circuit 12 comprises a signal conditioning network 13 consisting of a two-position switch unit 14, a wave shaping circuit 15 and an analog-to-digital converter circuit 16. The two-postion switch unit 14 has two input terminals connected to the output terminals of the above described upper and lower capacitance-type distance detector units 4 and 5, respectively, and is adapted to be manually operated to connect one of the detector units 4 and 5 to the signal processing circuit 12. The switch unit 14 further has an output terminal connected to the wave shaping circuit 15 so that the voltage signal produced by the capacitance-type distance detector unit 4 or 5 during operation of the tire inspecting apparatus is fed through the switch unit 14 to the wave shaping circuit 15. The wave shaping circuit 15 is adapted to amplify the input signal, filter out the high-frequency components of the amplified signal and suppress or reduce the range in magnitude of the resultant signal to a lower range which is operable within the dynamic range of the analog-to-digital converter 16 having an input terminal connected to the output terminal of the wave shaping circuit 15. The signal originally produced as the voltage signal continuously varying with the distance detected by the capacitance-type distance detector unit 4 or 5 is thus converted in the analog-to-digital circuit 16 into a succession of discrete binary signals representative of the changes in the detected distance at predetermined time intervals $\tau$ as shown in FIG. 8. The digital signal produced by the analog-to-digital converter 16 is supplied to an inspection circuit which is designated in its entirety by reference numeral 17 in FIG. 7.

The inspection circuit 17 comprises an input port 18, an address recorder 19, a memory unit 20, a central processing unit 21 (CPU) and an output port 22 and is operative to produce an output signal Sk if and when, during a predetermined period of time T, the distance represented by the digital signal supplied to the input port 18 is first decreased by an amount larger than a predetermined value Kh and is thereafter increased by an amount larger than a predetermined value Kh'. The signal Sk thus produced from the output port 22 of the inspection circuit 17 is representative of the existence on the side wall portion S or S' of the tire 1 (FIG. 4) of an objectionable convexity or projection C (FIG. 1) resulting from excessively coarse tire cord arrangement. The inspection circuit 17 may be further arranged as to produce an output signal Sk' if and when, during the predetermined period of time T, the distance represented by the digital signal supplied to the input port 18 of the inspection circuit 17 is first increased by an amount larger than the predetermined value Kh' and is thereafter decreased by an amount larger than the predetermined value Kh. The signal Sk' thus delivered from the output port 22 of the inspection circuit 17 is representative of the presence in the side wall portion S or S' of the tire 1 (FIG. 5) of an objectionable concavity or groove C' (FIG. 2) resulting from excessively dense tire cord arrangement. The inspection circuit 17 to achieve these functions may be constructed in such a manner as to determine the maximum value of the distance represented by the signal supplied to the input port 18 during the predetermined period of time T and the minimum values occurring prior and posterior to the maximum value during the period of time T, calculate the differences m and n between the maximum and minimum values, respectively, as indicated in FIG. 8. The output port 22 of the inspection circuit 17 thus arranged is connected to a suitable display device (not shown) which is adapted to produce a visual signal indicative of the presence of the objectionable convexity or concavity C or C' in the side wall portion of the tire being inspected.

Figure 10A:
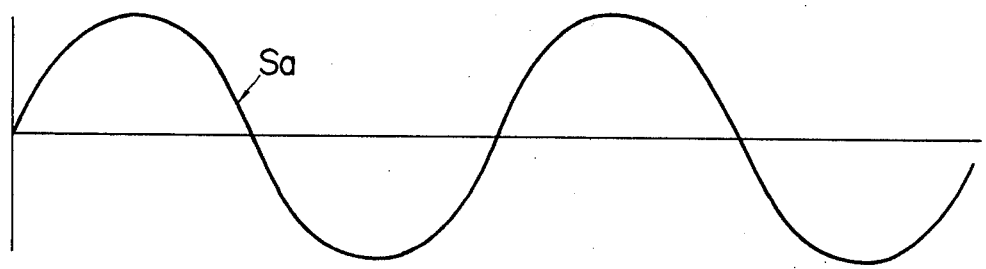

FIG. 9 shows an alternative example of the signal processing circuit of the tire inspecting apparatus according to the present invention. The signal processing circuit, now designated in its entirety by reference numeral 50, comprises a signal conditioning network 51 consisting of a two-position switch unit 52, a buffer circuit 53, a low-pass filter 54 and a wave suppressor circuit 55. The signal conditioning network 51 is shown constructed separately of the detector units 4 and 5 for simplicity of illustration but, in respect of its function, forms part of or can be constructed as part of the detector units 4 and 5 or each of the detector units. The two-position switch unit 52 has two input terminals connected to the output terminals of the capacitance-type distance detector units 4 and 5, respectively, of the arrangement illustrated in FIG. 5 and is adapted to be manually operated to connect one of the detector units 4 and 5 to the signal processing circuit 50. The two-position switch unit 52 furtherhas an output terminal connected to the input terminal of the buffer circuit 53 which is adapted to avoid reaction of the capacitance-type distance detector units 4 and 5 upon the circuit subsequent to the buffer circuit 53. The signal passed through the buffer circuit 53 is fed to the low-pass filter 54 which is adapted to remove high-frequency noises from the input signal and to deliver the resultant signal to the wave suppressor circuit 55. The wave suppressor circuit 55 is adapted to suppress the input signal into a signal Sa of a range operable within the dynamic range of the subsequent circuits. The voltage signal Sa thus produced by the wave suppressor circuit 55 is supplied to a differentiator circuit 56 which consists of a sample hold circuit 57 and a subtractor amplifier 58. In FIG. 10A, the voltage signal Sa is shown having a sinusoidal waveform by way of example.

Figure 10B:
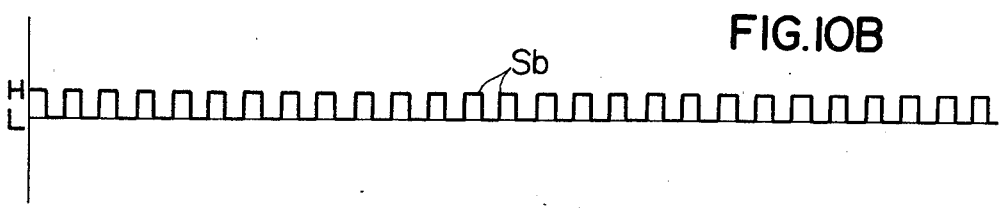
Figure 10C:
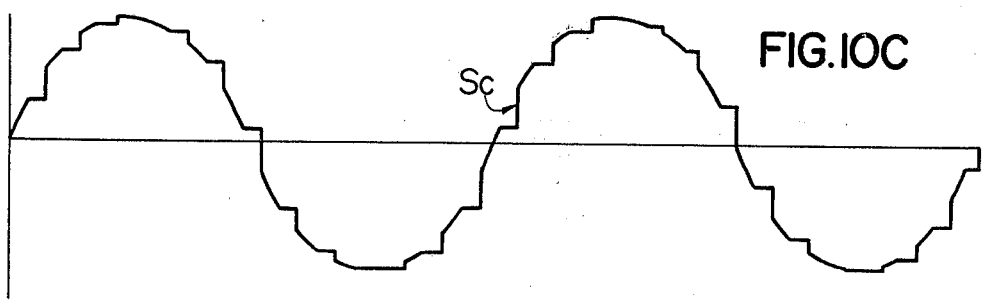

The same hold circuit 57 forming part of the differentiator circuit 56 has an input terminal connected to the output terminal of the above described wave suppressor circuit 55 and an input terminal connected to a suitable clock generator (not shown) adapted to produce a succession of regular clock pulses Sb having logic "1" and "0" levels H and L as indicated in FIG. 10B. The sample hold circuit 57 is operative to pass the input signal Sa without modification therethrough in response to clock pulses having the logic "1" value H and, when the clock pulses have the logic "0" level L, the sample hold circuit 57 modifies the input signal Sa in such a manner as to be maintained at the levels of the signal Sa fed to the sample hold circuit 57 at the ends of the time durations of the immediately preceding clock pulses having the logic "1" level H. When the signal Sa supplied to the sample hold circuit 57 has the sinusoidal waveform indicated in FIG. 10A, the sample hold circuit 57 is thus operative to produce an output signal Sc having a stepwise varying waveform as indicated in FIG. 10C.

The subtractor amplifier 58 also forming part of the differentiator circuit 56 has an input terminal connected to the output terminal of the sample hold circuit 57 thus arranged and an input terminal connected to the output terminal of the wave suppressor circuit 55. The subtractor amplifier 58 is thus supplied with the signal Sa delivered from the wave suppressor circuit 55 and the signal Sc delivered from the sample hold circuit 57 and is operative to subtract the signal Sc from the signal Sa and produce an output signal Sd (FIG. 10D) which is equal in magnitude to the difference between the signals Sa and Sc. The signal Sd delivered from the subtractor amplifier 58 is, thus, representative of the differential coefficient of the signal Sawith respect to time and is indicative of the rates of change in the magnitude of the signal Sa during the time durations of the clock pulses Sb having the logic "0" level, viz., the rates at which the detected distance between the capacitance-type distance detector unit 4 or 5 and the side wall portion 1a of the tire 1 (FIG. 5) varies per predetermined circumferential unit length of the side wall portion of the tire when the tire is rotated at a predetermined angular velocity about the center axis thereof. The signal Sd thus produced by the subtractor amplifier 58 is supplied to a signal modifier circuit 59 consisting of first and second comparators 60 and 60', first and second sampling clock generators 61 and 61', first and second sample hold circuits 62 and 62', and first and second substractor amplifiers 63 and 63'.

Figure 4:
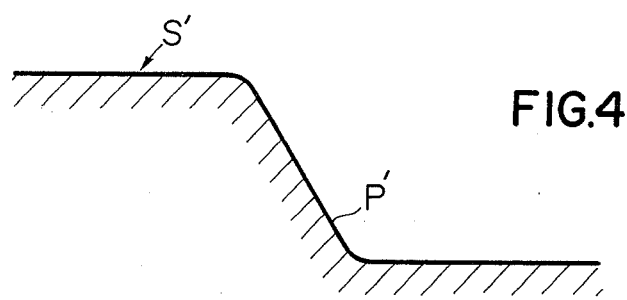
FIG. 4 is a view similar to FIG. 3 but shows a portion of the cross section of a side wall portion of a pneumatic tire having in the side wall portion a stepped radial depression resulting from the overlap between opposite end portions of the tire cord fabric forming part of the side wall portion of the tire.
Figure 10D:
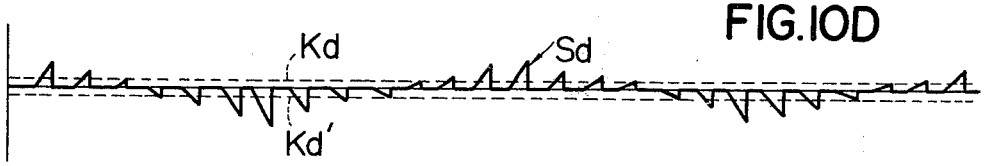
Figure 10E:
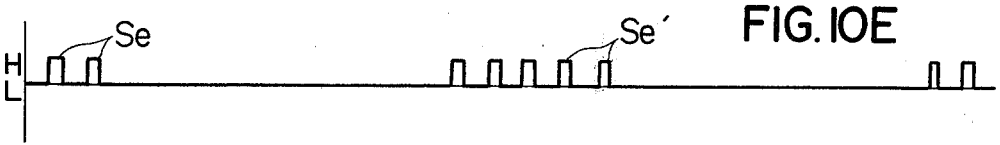
Figure 10E:
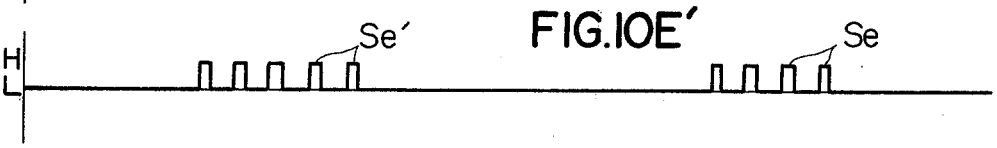

The first and second comparators 60 and 60' forming part of the signal modifier circuit 59 have respective input terminals connected in parallel to the output terminal of the subtractor amplifier 58 of the above described differentiator circuit 56 and are operative to compare the output signal Sd of the substractor amplifier with reference signals representative of first and second predetermined values Kd and Kd' (FIG. 10D), respectively, and deliver a series of pulses Se and a series of pulses Se', respectively, as shown in FIGS. 10E and 10E' when the magnitude of the input signal Sd is larger in absolute value than the predetermined values Kd and Kd', respectively. One of the purposes of the comparators 60 and 60' is thus to neglect from the signal Sd those components which result from the gradual decrease or increase in the detected distance as caused by the stepped radial protrusion P (FIG. 3) or the stepped radial depression P' (FIG. 4).

Figure 10F:
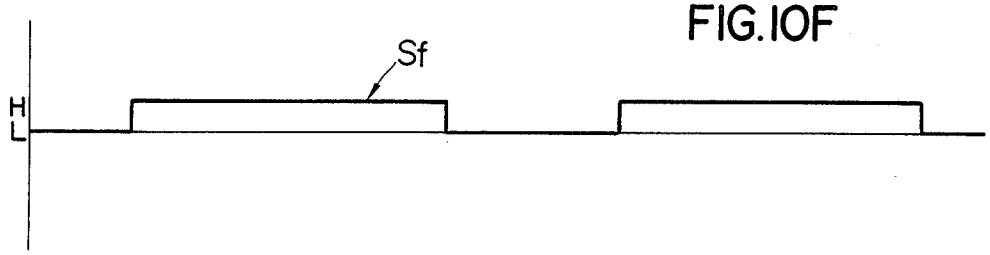
Figure 10F:
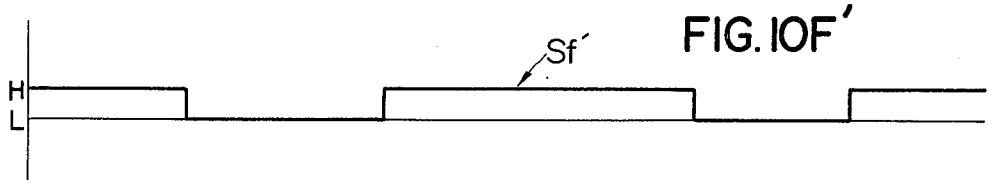

The pulses Se and Se' thus delivered respectively from the first and second comparators 60 and 60' are fed to the first and second sampling clock generators 61 and 61', respectively, which are connected to the previously mentioned clock generator producing the clock pulses Sb. In response to the clock pulses Sb and the pulses Se delivered from the first comparator 60, the first sampling clock generator 61 produces output pulses Sf (FIG. 10F) each inversely responsive to each of the discrete groups of the pulses Se. Likewise, the second sampling clock generator 61' is operative to produce output pulses Sf' (FIG. 10F') each inversely responsive to each of the discrete groups of the pulses Se' delivered from the second comparator 60'. Each of the pulses Sf delivered from the first sampling clock generator 61 and each of the pulses Sf' delivered from the second sampling clock generator 61' have pulseswidths which are slightly larger than the time durations between the discrete groups of the pulses Se and each of the discrete groups of the pulses Se', respectively. The difference between the time durations between the pulses Sf and the time duration of each group of the pulses Se and the difference between the time durations between the pulses Sf' and the time duration of each group of the pulses Se' are, however, each approximately equal to the period of time of one cycle of the clock pulses Sb and are practically negligible since each cycle of the clock pulses Sb is actually of the order of nanoseconds.

Figure 10G:
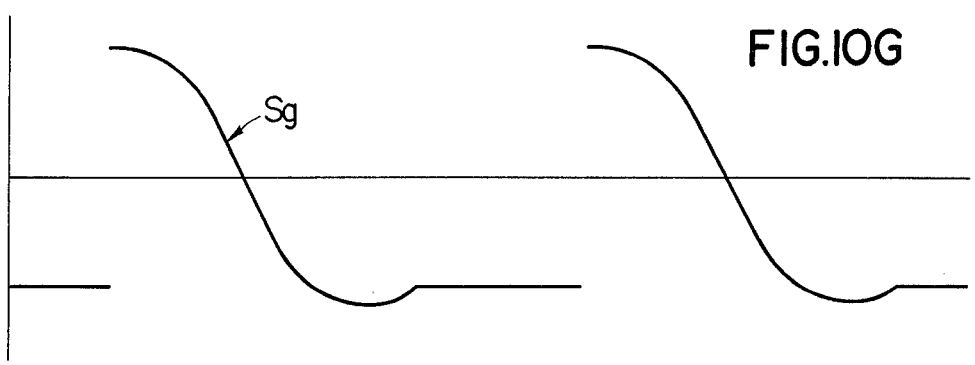
Figure 10G:
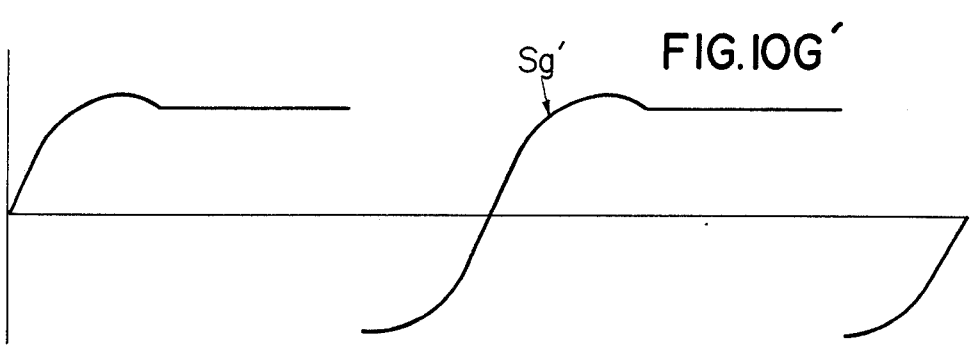
Figure 10J:
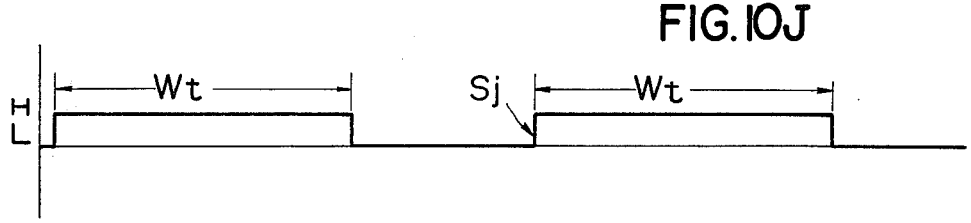
Figure 10J:
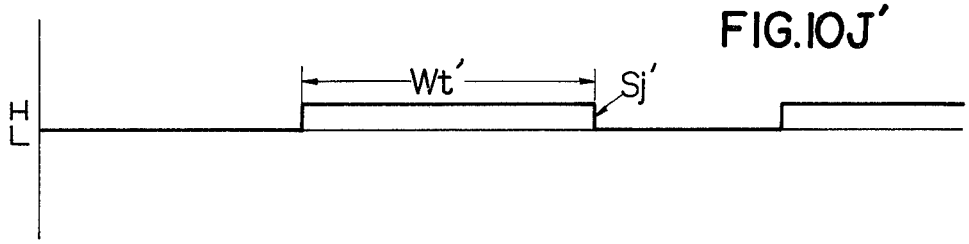
Figure 10K:
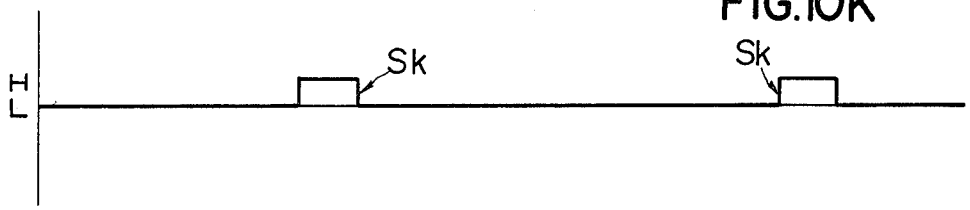
Figure 10K:
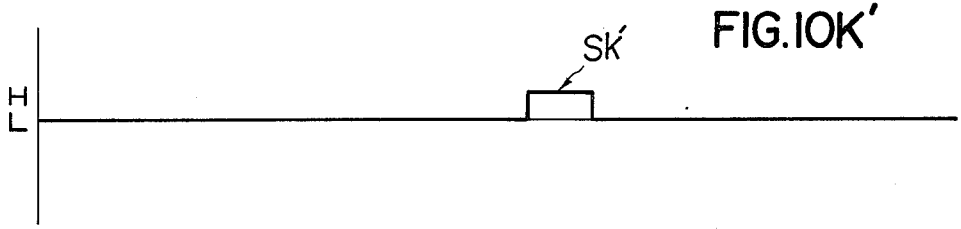

The first and second sample hold circuits 62 and 62' have first input terminals connected to the output terminals of the first and second sampling clock generators 61 and 61', respectively, and second input terminals jointly connected to the output terminal of the wave suppressor circuit 55 of the signal conditioning network 51 as shown. The first and second sample hold circuits 62 and 62' are thus supplied with the voltage signal Sa from the wave suppressor circuit 55 and the sampling clock pulses Sf and Sf' from the first and second sampling clock generators 61 and 61', respectively. The first sample hold circuit 62 is operative to pass the input signal Sa without modification therethrough in response to the sampling clock pulses Sf having a logic "1" value H and, when the sampling clock pulses Sf have a logic "0" value L, the sample hold circuit 62 modifies the input signal Sa in such a manner as to remain at the levels of the signal Sa fed to the sample hold circuit 62 at the ends of the time durations of the immediately preceding sampling clock pulses Sf of the logic "1" level. Likewise, the second sample hold circuit 62' is adapted to pass the input signal Sa without modification therethrough in response to the sampling clock pulses Sf' having a logic "1" level H and, when the sampling clock pulses Sf' have a logic "0" level, the sample hold circuit 62' modifies the input signal Sa in such a manner as to remain at the levels of the signal Sa fed to the sample hold circuit 62' at the ends of the time durations of the immediately preceding sampling clock pulses Sf' of the logic "1" level. Thus, the first and second sample hold circuits 62 and 62' deliver stepwise varying output signals Sg and Sg', respectively, illustrated in FIGS. 10G and 10G', respectively, in response to the voltage signal Sa shown in FIG. 10A and the sampling clock pulses Sf and Sf' shown in FIGS. 10F and 10F', respectively.

The output signals Sg and Sg' of the first and second sample hold circuits 62 and 62' are fed to the first and second subtractor amplifiers 63 and 63', respectively, having first input terminals connected to the output terminals of the sample hold circuits 62 and 62', respectively, and second input terminals jointly connected to the output terminal of the wave suppressorcircuit 55 of the signal conditioning network 51 as shown. The first subtractor amplifier 63 is thus supplied with the voltage signal Sa from the wave suppressor circuit 55 and the stepwise varying signal Sg from the first sample hold circuit 62 and is operative to subtract the signal Sg from the signal Sa and produce an output signal Sh (FIG. 10G) which is equal to the difference in magnitude between the signals Sa and Sg. Similarly, the second subtractor amplifier 63' is supplied with the voltage signal Sa from the wave suppressor circuit 55 and the stepwise varying signal Sg' from the second sample hold circuit 62' and produce an output signal Sh' (FIG. 10G') which is equal to the difference in magnitude between the signals Sa and Sg'. The signal Sh delivered from the first subtractor amplifier 63 is representative of the rates of increase in the magnitude of the signal Sa, viz., the rates of decrease in the detected distance between the distance detector unit 4 or 5 and the side wall portion of the tire 1 (FIG. 5) when the differential coefficient of the signal Sa is larger in absolute value than the predetermined value Kd (FIG. 10D). On the other hand, the signal Sh' delivered from the second subtractor amplifier 63' is representative of the rates of decrease in the magnitude of the signal Sa, viz., the rates of increase in the detected distance between the distance detector unit 4 or 5 and the side wall portion of the tire 1 (FIG. 5) when the differential coefficient of the signal Sa is larger in absolute value than the predetermined value Kd' (FIG. 10D').

The signals Sh and Sh' thus delivered from the first and second subtractor amplifiers 63 and 63', respectively, are fed to a comparator circuit 64 consisting of first and second comparators 65 and 65'. The first comparator 65 has an input terminal connected to the output terminal of the first subtractor amplifier 63 and an input terminal connected to a suitable source (not shown) of a reference signal representative of a predetermined value Kh (FIG. 10H) and is adapted to compare the input signal Sh with the reference signal for producing output pulses Si having a logic "1" level H as indicated in FIG. 10I when the signal Sh is larger in magnitude than the reference signal representative of the predetermined value Kh. Likewise, the second comparator 65' has an input terminal connected to the output terminal of the second subtractor amplifier 63' and an input terminal connected to a suitable source (not shown) of a reference signal representative of a predetermined value Kh' (FIG. 10H') and is operative to compare the input signal Sh' with the reference signal representative of the value Kh' for producing output pulses Si' having a logic "1" level as indicated in FIG. 10I' when the signal Sh' is smaller in magnitude than the reference signal representative of the predetermined value Kh'. The predetermined values Kh and Kh' are respectively selected in consideration of the height h of the radial projection C of the side wall portion S shown in FIG. 1 and the depth d of the radial groove C' in the side wall portion S' shown in FIG. 2. The output signals Si and Si' thus delivered from the first and second comparators 65 and 65', respectively, are fed to a discriminating circuit 66 which consists of first and second timers 67 and 67' and first and second or convexity and concavity discriminators 68 and 69.

The first and second timers 67 and 67' have input terminals connected to the output terminals of the above described first and second comparators 65 and 65', respectively, and are adapted to produce output pulses Sj and Sj' having a logic "1" level and predetermined pulsewidths Wt and Wt' in response to the pulses Si and Si' delivered from the first and second comparators 65 and 65', respectively. The pulsewidth Wt of the pulses Sj delivered from the first timer 67 and the pulsewidth Wt' of the pulses Sj' correspond to predetermined periods of time t and t', respectively and are selected in consideration of the widths w and w' of the radial projection C and the radial groove C' of the side wall portions S and S' shown in FIGS. 1 and 2, respectively. Thus, the pulsewidth Wt of the pulses Sj and the pulsewidth Wt' of the pulses Sj' vary depending upon the circumferential velocity at which the side wall portions 1a of the tire 1 are to be turned about the center axis of the tire 1 and the measurement of the sensing surface 4a to 5a of the capacitance-type distance detector unit 4 or 5 (FIG. 6).

The first or convexity discriminator 68 is constituted by a two-input logic "AND" gate circuit having an input terminal connected to the output terminal of the first timer 67 and an input terminal connected to the output terminal of the second comparator 65' and, likewise, the second or concavity discriminator 69 is constituted by a two-input logic "AND" gate circuit having an input terminal connected to the output terminal of the second timer 67' and an input terminal connected to the output terminal of the first comparator 65. The first or convexity discriminator 68 is thus operative to produce an output pulse Sk in the presence of both of the pulse Sj at the output terminal of the first timer 67 and the pulse Si' at the output terminal of the second comparator 65' and, likewise, the second or concavity discriminator 69 is operative to produce an output pulse Sk' in the presence of both of the pulse Sj' at the output terminal of the second timer 67' and the pulse Si at the output terminal of the first comparator 65. The pulse Sk delivered from the first or convexity discriminator 68 is indicative of the presence of the objectionable convexity C on the side wall portion of the tire 1 being inspected and the pulse Sk' delivered from the second or concavity discriminator 69 is indicative of the presence of the objectionable concavity C' in the side wall portion of the tire 1. The first and second or convexity and concavity discriminators 68 and 69 have output terminals electrically connected to suitable display devices (not shown), respectively, which are adapted to be actuated to produce visual signals in response to the pulses Sk and Sk' delivered from the discriminators 68 and 69, respectively.

While it has been described that the pneumatic tire to be inspected in accordance with the present invention is to be driven to turn about the center axis thereof with the capacitance-type distance detector units held stationary, it should be borne in mind that such arrangement is merely by way of example and that the tire inspecting apparatus according to the present invention may be arranged so that each of the capacitance-type distance detectors is driven to turn about the center axis of the tire which is held at rest with respect to a stationary structure.

What is claimed is:

1. A method for inspecting an inflated pneumatic tire for an irregularity in the arrangement of the tire cords forming part of a side wall portion of the tire, comprising the steps of:

driving one of the tires and capacitance-type distance detector unit positioned in the vicinity of the side wall portion of the tire so that the detector unit and the tire are continuously rotated with respect to each other about the center axis of the tire, the distance detector unit providing an analog signal indicative of the continuously measured distance between the detector unit and the side wall portion of the tire in a circumferential direction of the side wall;

determining from said signal a distance change representative of a surface irregularity resulting from the irregularity in the arrangement of the tire cords, the distance charge being detected by:

(1) differentiating said signal with respect to time to produce a signal representative of the differential coefficient of the distance between the side wall and the detector unit, (2) producing a first signal substantially representative of an amount of change in the distance between the side wall and the detector unit when the differential coefficient indicates a distance change in a first direction that is larger in magnitude than a first predetermined value and a second signal substantially representative of an amount of change in the distance between the side wall and the detector unit when the differential coefficient indicates a distance change in a second direction opposite to the first direction that is larger in magnitude than a second predetermined value, (3) comparing said first and second signals with reference signals representing third and fourth predetermined values, respectively, for producing (a) a third signal when said first signal is larger in magnitude than the third predetermined value reference signal and (b) a fourth signal when said second signal is larger in magnitude than the fourth predetermined value reference signal, and (4) producing a fifth signal in the presence of said fourth signal during a first predetermined period of time after said third signal is produced and a sixth signal in the presence of said third signal during a second predetermined period of time after said fourth signal is produced.

2. A method as set forth in claim 1, in which said distance change is detected from said signal when, during a predetermined period of time, the distance represented by the signal changes in one direction by an amount larger than a predetermined value and thereafter changes in the opposite direction by an amount larger than a predetermined value.

3. A method as set forth in claim 1, in which said first and second signals are produced by comparing the output signal from said differentiator circuit with reference signals respectively representative of said first and second predetermined values for producing a first succession of pulses when the signal representative of said differential coefficient is larger in magnitude than the reference signal representative of said first predetermined value and a second succession of pulses when the signal representative of said differential coefficient is larger in magnitude than the reference signal representative of said second predetermined value, producing a first sampling clock signal in the absence of said first succession of pulses and a second sampling clock signal in the absence of said second succession of pulses, producing a first sampled signal by holding the signal from said detector unit without modification in the presence of said first sampling clock signal and, in the absence of the first sampling clock signal, the signal from the detector unit in such a manner as to retain the value which the signal from the detector unit assumes at the end of the time duration of said first sampling clock signal and a second sampled signal by holding the signal from the detector unit without modification in the presence of said second sampling clock signal and, in the absence of the second sampling clock signal, modifying the signal from the detector unit in such a manner as to retain the value which the signal from the detector unit assumes at the end of the time duration of said second sampling clock signal, and subtracting said first and second sampled signals from said signal from said detector unit for thereby producing said first and second signals as being representative of the differences in magnitude between the signal from the detector unit and said first and second sampled signals, respectively.

4. A method as set forth in claim 3, in which said fifth and sixths signals are produced by producing a first pulse signal having a predetermined pulsewidth corresponding to said first predetermined period of time in response to said third signal and a second pulse signal having a predetermined pulsewidth corresponding to said second predetermined period of time, producing said fifth signal in the presence of both of said fourth signal and said first pulse signal, and producing said sixth signal in the presence of both of said third signal and said second pulse signal.

5. A method as set forth in claim 4, in which the signal representative of said differential coefficient is produced by producing a succession of clock pulses, producing a sampled signal by holding the signal from said detector unit without modification in the presence of said clock pulse and, in the absence of the clock pulses, modifying the signal from the detector unit in such a manner as to remain at the levels which the signal from the detector unit assumes at the ends of the time durations of the immediately preceding clock pulse, and subtracting the last named sampled signal from the signal from said detector unit for producing said signal representative of said differential coefficient.

6. A tire inspecting apparatus for inspecting an inflated pneumatic tire for an irregularity in the arrangement of the tire cords forming part of a side wall portion of the tire, comprising:

a capacitance-type distance detector unit positioned in the vicinity of a side wall portion of the tire;

drive means operative to drive one of the tires and the detector unit so that the detector unit and the tire are continuously rotated with respect to each other about the center axis of the tire;

said detector unit being operative to produce an analog signal variable with the distance between the detector unit and the side wall portion of the tire continuously in a circumferential direction of the side wall portion; and electric signal processing means electrically connected to said detector unit and operative to detect from said signal a distance change representative of a surface irregularity resulting from the irregularity in the arrangement of the tire cords, the electric signal processing means comprising:

a differentiator circuit electrically connected to said distance detector unit and operative to differentiate said signal with respect to time and to produce an output signal representative of the differential coefficient of the distance represented by the signal from the detector unit, a signal modifier circuit connected to the output terminal of said differentiator circuit and operative to produce a first output signal substantially representative of an amount of change in the distance between the side wall and the detector unit when the output signal from the differentiator circuit indicates a distance change in a first direction that is larger in magnitude than a first predetermined value and a second output signal substantially representative of an amount of change in the distance between the side wall and the detector unit when the output signal from the differentiator circuit indicates a distance change in a second direction opposite to the first direction and larger in magnitude than a second predetermined value, a comparator circuit connected to said signal modifier circuit for comparing said first and second output signals with reference signals representative third and fourth predetermined values, respectively, and for producing (a) a third output signal when the first output signal from the signal modifier circuit is larger in magnitude than the third predetermined value reference signal and (b) a fourth output signal when the second output signal from the signal modifier circuit is larger in magnitude than the fourth predetermined value reference signal, and a discriminating circuit connected to said comparator circuit and operative to produce a fifth output signal in the presence of said fourth output signal during a first predetermined period of time after said third output signal is produced by said comparator circuit and a sixth output signal in the presence of said third output signal during a second predetermined period of time after said fourth output signal is produced by the comparator circuit.

7. A tire inspecting apparatus as set forth in claim 6, in which said signal modifier circuit comprises first and second comparators connected in parallel with each other to said differentiator circuit and operative to compare the output signal from said differentiator circuit with reference signals respectively representative of said first and second predetermined values and to produce a first succession of pulses when the signal from said differentiator circuit is larger in magnitude than the reference signal representative of said first predetermined value and a second succession of pulses when the signal from said differentiator circuit is larger in magnitude than the reference signal representative of said second predetermined value, first and second sampling clock generators connected to said first and second comparators, respectively, the first sampling clock generator being operative to produce a first sampling clock signal in the absence of said first succession of pulses and the second sampling clock generator being operative to produce a second sampling clock signal in the absence of said second succession of pulses, first and second sample holding circuits connected to the output terminals of said first and second sampling clock generators, respectively, and jointly to the output terminal of said detector unit, the first sample holding circuit being operative to produce a first sampled signal by holding the signal from said detector unit without modification in the presence of said first sampling clock signal and, in the absence of the first sampling clock signal, modifying the signal from the detector unit in such a manner as to retain the level which the signal from the detector unit assumes at the end of the time duration of said first sampling clock signal and said second sample holding circuit being operative to produce a second sampled signal by holding the signal from said detector unit without modification in the presence of said second sampling clock signal and, in the absence of the second sampling clock signal, modifying the signal from the detector unit in such a manner as to retain the level which the signal from the detector unit assumes at the end of the time duration of the second sampling clock signal, and first and second subtractor circuits connected to the output terminals of said first and second sample holding circuits, respectively, and jointly to the output terminal of said detector unit, the first subtractor circuit being operative to subtract said first sampled signal from the signal from the detector unit for producing said first output signal as being representative of the difference in magnitude between the signal from the detector unit and said first sampled signal and said second subtractor circuit being operative to subtract said second sampled signal from the signal from the detector unit for producing said second output signal as being representative of the difference in magnitude between the signal from the detector unit and said second sampled signal.

8. A tire inspecting apparatus as set forth in claim 7, in which said discriminating circuit comprises first and second timers connected in parallel with each other to said comparator circuit and operative to produce first and second pulse signals having predetermined pulsewidths corresponding to said first and second predetermined periods of time, and first and second discriminators connected to said first and second timers, respectively, the first discriminator being operative to produce said fifth output signal in the presence of both of said fourth output signal from said comparator circuit and said first pulse signal and said second discriminator circuit being operative to produce said sixth output signal in the presence of both of said third output signal from said comparator circuit and said second pulse signal.

9. A tire inspecting apparatus as set forth in claim 8, in which said differentiator circuit comprises a sample holding circuit connected to the output terminal of said detector unit and to a source of clock pulses and operative to produce an output signal by holding the signal from the detector unit without modification in the presence of said clock pulses and, in the absence of the clock pulses, modifying the signal from the detector unit in such a manner as to remain at the levels which the signal from the detector unit assumes at the ends of the time durations of the immediately preceding clock pulses, and a subtractor circuit connected to the output terminal of said detector unit and the output terminal of said sample holding circuit and operative to subtract the output signal of the sample holding circuit of the differentiator circuit from the signal from said detector unit for producing said signal representative of said differential coefficient.

10. A tire inspecting apparatus as set forth in claims 6, 7, 8, or 9, in which said capacitance-type distance detector unit has a sensing surface which measures wider in a direction to correspond to a radial direction of the side wall portion of the tire than in a direction to correspond to a circumferential direction of the side wall portion of the tire.

* * * * *